(12) United States Patent
Riera Jorba et al.

(10) Patent No.: US 9,155,959 B2
(45) Date of Patent: Oct. 13, 2015

(54) METHOD AND SYSTEM FOR THE GENERATION OF A FILE OF AUDITABLE RECORDS FOR REMOTE AND ON-SITE ELECTRONIC GAMING

(75) Inventors: Andreu Riera Jorba, Barcelona (ES); Vanesa Daza Fernandez, Sant Cugat del Vallès (ES)

(73) Assignee: SCYTL SECURE ELECTRONIC VOTING S.A., Barcelona (ES)

( * ) Notice: Subject to any disclaimer, the term of this patent is extended or adjusted under 35 U.S.C. 154(b) by 2163 days.

(21) Appl. No.: 11/995,785

(22) PCT Filed: Jul. 15, 2005

(86) PCT No.: PCT/ES2005/000400
§ 371 (c)(1),
(2), (4) Date: Jul. 14, 2008

(87) PCT Pub. No.: WO2007/010055
PCT Pub. Date: Jan. 25, 2007

(65) Prior Publication Data
US 2008/0287188 A1 Nov. 20, 2008

(30) Foreign Application Priority Data
Jul. 15, 2005 (WO) ................. PCT/ES2005/000400

(51) Int. Cl.
*G07F 17/00* (2006.01)
*A63F 9/24* (2006.01)
(Continued)

(52) U.S. Cl.
CPC . *A63F 9/24* (2013.01); *A63F 13/12* (2013.01); *G06F 21/645* (2013.01); *A63F 1/00* (2013.01);
(Continued)

(58) Field of Classification Search
USPC .................................................... 463/16, 17
See application file for complete search history.

(56) References Cited

U.S. PATENT DOCUMENTS 4,926,327 A   5/1990   Sidley
5,038,022 A   8/1991   Lucero
(Continued)

FOREIGN PATENT DOCUMENTS

GB    2 307 184 A     5/1997
WO    WO 98/11686     3/1998
(Continued)

OTHER PUBLICATIONS

Bao, F. "Security Analysis of a Password Authenticated Key Exchange Protocol" Proceedings of 6th Information Security Conference—ISC 2003, LNCS 2851, pp. 208-217, Springer-Verlag Heidelberg, 2003, ISSN: 0302-9743, Information Security: 6th International Conference, ISC 2003, Bristol, UK, Oct. 1-3, 2003. Proceedings, ISBN: 3-540-20176-9.

(Continued)

*Primary Examiner* — Reginald Renwick
(74) *Attorney, Agent, or Firm* — RatnerPrestia

(57) ABSTRACT

Methods and systems that enable reliable audits of a number of predetermined trust requirements for games by electronic means, either on-site or remote, are disclosed. A system including a gaming module to which the players interact with a security module and an audit module capable of several degrees of dispersion and/or grouping performs provision by the gaming module to the security module of digital information containing significant events occurred during the games, generation by the security module of a protected record for each of the cited significant events, storage by the security module of every protected record, generating a file of protected records, and access by the audit module to the file of protected records, independent from the games operator, to verify the correct development of the games.

23 Claims, 7 Drawing Sheets

(51) Int. Cl.
  *A63F 13/30* (2014.01)
  *G06F 21/64* (2013.01)
  *A63F 1/00* (2006.01)

(52) U.S. Cl.
  CPC ... *A63F 2009/2489* (2013.01); *A63F 2300/532* (2013.01); *A63F 2300/5586* (2013.01); *G06F 2221/2101* (2013.01); *G06F 2221/2109* (2013.01); *G06F 2221/2111* (2013.01)

(56) References Cited

U.S. PATENT DOCUMENTS

| | | | |
|---|---|---|---|
| 6,030,288 A | 2/2000 | Davis et al. | |
| 6,099,408 A | 8/2000 | Schneier et al. | |
| 6,106,396 A | 8/2000 | Alcorn et al. | |
| 6,117,011 A | 9/2000 | Lvov | |
| 6,165,072 A | 12/2000 | Davis et al. | |
| 6,264,560 B1 | 7/2001 | Goldberg et al. | |
| 6,612,928 B1 | 9/2003 | Bradford et al. | |
| 6,934,846 B2 * | 8/2005 | Szrek et al. | 713/180 |
| 7,753,770 B2 * | 7/2010 | Walker et al. | 463/16 |
| 8,047,908 B2 * | 11/2011 | Walker et al. | 463/16 |
| 2001/0008842 A1 * | 7/2001 | Walker et al. | 463/16 |
| 2001/0016514 A1 * | 8/2001 | Walker et al. | 463/17 |
| 2002/0160834 A1 | 10/2002 | Urie et al. | |
| 2004/0127277 A1 * | 7/2004 | Walker et al. | 463/16 |
| 2004/0192438 A1 | 9/2004 | Wells et al. | |
| 2004/0192442 A1 | 9/2004 | Wells et al. | |
| 2004/0198494 A1 | 10/2004 | Nguyen et al. | |
| 2006/0189371 A1 * | 8/2006 | Walker et al. | 463/16 |
| 2008/0182667 A1 * | 7/2008 | Davis et al. | 463/43 |

FOREIGN PATENT DOCUMENTS

| | | |
|---|---|---|
| WO | WO 2004/034223 A2 | 4/2004 |
| WO | WO 2004/035159 A1 | 4/2004 |
| WO | WO 2005/021118 A1 | 3/2005 |

OTHER PUBLICATIONS

Blum, M. "Coin Flipping by Telephone: a Protocol for Solving Impossible Problems" Proc. IEEE Computer Conference, pp. 133-137, IEEE, 1982.

International Search Report for PCT International Application No. PCT/ES2005/000400 mailed Apr. 5, 2006.

* cited by examiner

METHOD AND SYSTEM FOR THE GENERATION OF A FILE OF AUDITABLE RECORDS FOR REMOTE AND ON-SITE ELECTRONIC GAMING

This application is a U.S. National Phase Application of PCT International Application No. PCT/ES2005/000400, filed Jul. 15, 2005.

FIELD OF THE INVENTION

The present invention describes a method and a system destined to warrant some characteristics (such as honesty and fairness) related to the trustworthiness of the development of games by electronic means. This objective is achieved by recording the activity occurred during said games and by storing it securely through the use of cryptographic operations. In this way, a file of protected records is generated that enables reliable periodic audits regarding the actions occurred during the games. This brings additional trust to the games. The present invention can be applied both to on-site electronic games and to remote (through a communication network) electronic games.

The system applicable to games by electronic means of the present invention introduces two separate modules or functional parts. The first part, called the security module, is essentially destined to the protection of digital information by using cryptographic tools. The second part, called the audit module, allows verifying the honesty and fairness of the games. This is done by reproducing part of what has occurred during the games and using, if needed, the games' logics. The invention pretends to avoid interfering in excess in the game dynamics habitually experienced by the players.

BACKGROUND

In the case of games by electronic means, the players participate in game hands by using electronic systems, computers, and/or communication networks. In some occasions, the games by electronic means are on-site. In such cases, the player directly interacts with a gaming electronic machine located in a gaming centre or in a certain place where the player must be present to be able to play. In other occasions, the games by electronic means are remote. In such other cases, the player remotely interacts with the electronic system of gaming, usually through his/her personal computer and an Internet (or equivalent network) connection. In both cases the variety of offered games is broad: casino games such as roulette or blackjack, sport books, poker hands, bingo, jackpot machines, etcetera.

Gaming by electronic means, in any of its forms, implies a lack of transparency that may produce suspicions and lack of trust regarding critical aspects of honesty and fairness. In fact, in some occasions the lack of transparency of gaming by electronic means has been successfully utilized to commit fraud. For this reason, the electronic gaming industry has been using two mechanisms to try to ensure the correct development of the games. On one hand, the source code certification of the computer programs that determine the functioning of the electronic games. On the other hand, the audits of the statistics of prizes awarding.

Nonetheless, both mechanisms have serious deficiencies. Indeed, the certification of the source code of the gaming programs is in fact an inspection of the system done at a given time by an independent testing laboratory. This inspection can ensure that, at that precise time, the system presented a correct design that would therefore lead to an honest behavior. However, this inspection has no means to prove that the system will keep having, from that moment and on, those correct design and behavior. The programs of an electronic gaming module can be certified today but, perhaps tomorrow they will be altered or substituted, either accidentally or intentionally. Although some procedures to check for changes and manipulations in a computer program do exist, the actual capability to easily and quickly substitute the critical correct modules by the fake ones and vice versa, prevents in practice these procedures from being successful as security measures.

The audits of prizes awarding are done after the games have taken place. These audits try to demonstrate the correct functioning of the electronic games by matching the publicly known statistics of every type of game against the actual data derived from the real prizes awarded by the gaming system. Unfortunately, these audits are just able to warrant that the amount of prizes awarded is statistically correct. However, they are absolutely unable to prove the fairness or honesty of the occurred games. In practice, a given fraction of the prizes could have been awarded deliberately to certain players in order to launder money or just to obtain a financial gain by cheating some players.

Given the previously introduced limitations of the main control mechanisms used by the electronic gaming industry, there is currently some unrest regarding the trustworthiness of the games by electronic means. The following issues can be highlighted:

1. In the case of remote electronic gaming, the identification of players is an issue. The use of low-quality player identification allows fraudulent actions, such as money laundering. It also allows access to the games by non-authorized players (e.g., minors).
2. In the case of electronic games based on electronically generated randomness (almost all types of electronic games excepting few cases such as sport booking), there can be reasonable doubts regarding the fraudulent manipulation of the process of generating the random events (e.g., manipulations to predict or somehow to influence the outcome of future random events).
3. Later audits take as input the records generated by the electronic gaming system itself. Nonetheless, these records are insufficiently protected against internal attacks (e.g., from technical staff with privileged access to the electronic gaming system). As a result, the truthfulness of the records remains unsure.

A deeper analysis of these three issues and of the solutions proposed up to date is now discussed.

The identification of players in remote electronic gaming has been up to date supported by the ownership of the credit card used for the money transfers caused by bets and prizes. However, this identification mechanism is clearly insufficient since any person can impersonate another just by having access to the credit card of the latter (which is relatively easy for example in the case of members of the same family or if the credit card was stolen). In addition, this mechanism is not satisfactory for the management of lists of auto-excluded players or problem gamblers. The identification of players based on the ownership of credit cards has been usually combined with the "loginname/password" mechanism. In these cases, the identity of the player is verified by checking that the provided "password" matches the one generated during a previous process of user registration. However, the "loginname/password" mechanism has well-known weaknesses that make its use inadequate in open networks. Not only passwords can be intercepted (allowing impersonation by non-authorized persons), but they can also be attacked by "phishing", Trojan horses, or brute-force attacks, among other methods. A complete analysis of the weaknesses presented by the "loginname/password" mechanism can be found in [A. Shimizu, T. Horioka y H. Inagaki, A Password Authentication Method for Contents Communication on the Internet, IEICE Transactions on Communications, vol. E81-B, no. 8, pp. 1666-1673, August 1998] or [F. Bao, Security Analysis of a Password Authenticated Key Exchange Protocol, Proceedings of 6th Information Security Conference—ISC 2003, LNCS 2851, pp. 208-217, Springer-Verlag Heidelberg, 2003, ISSN: 0302-9743, Information Security: 6th International Conference, ISC 2003, Bristol, UK, Oct. 1-3, 2003. Proceedings, ISBN: 3-540-20176-9].

More recent proposals suggest the use of biometric mechanisms to ensure a correct identification of players, both in on-site gaming systems and in remote gaming systems. To cite some proposals, the inventions described in U.S. Pat. No. 6,612,928, US 2004192438 and US 2004192442 are examples applicable to remote gaming environments. The patent application US 2002160834 proposes a solution based on a biometric reader placed on several kiosks. Therefore, this solution is suitable for on-site electronic gaming environments. However, biometric identification has its own disadvantages. On one hand, it is too intrusive for the player. On the other hand, in remote gaming environments, it is still not clear how to ensure that the reading of the biometric pattern takes place at the time of the game (i.e., that it does not provide from a previous reading).

With regard to the trustworthiness of the generation, by electronic means, of random events, the root of the problem is in the vulnerability presented by excessively centralized generations. Indeed, in the current electronic gaming modules, the control of the process of generating randomness is fully deposited on a single central point (always under the command of the gaming operator and/or its staff). There are some previous proposals with the objective of overcoming the problems of fraudulent generation of randomness posed by this vulnerability. These proposals are based on the joint generation of randomness by different parties, in such a way that none of them (in particular, the gaming operator) becomes a central point of control. The use of these joint generation methods ensures the fairness of the resulting random numbers, provided that all of the different parties do not collude. Not only none of the parties is able to manipulate the outcome of the electronic joint generation of random events, but also none of the parties has any privileged information regarding future random events. Representative examples of collaborative or joint generation of random numbers are the proposals made by Manuel Blum in 1982 [Blum M., Coin Flipping by Telephone: a Protocol for Solving Impossible Problems, Proc. IEEE Computer Conference, pp. 133-137, IEEE, 1982] and by Joe Kilian in 1990 [Kilian, J., Uses of Randomness in Algorithms and Protocols, ACM Distinguished Dissertation, MIT, 1990, ISBN: 0-262-11153-5]. The previous inventions described in U.S. Pat. No. 6,099,408, U.S. Pat. No. 6,030,288, WO 2004/035159 and WO 2005/021118, take advantage of these mechanisms of joint or collaborative generation of random numbers, to try to ensure the fairness of games. Nonetheless, the main problem of these proposals is their lack of practicality, since they require the active participation of the players in the process of joint generation of randomness. In practice, this creates a dependency on the behavior of unknown and highly heterogenic systems (i.e., the client systems used by players). A possible variant, based on the delegation of the joint generation to a third party not directly controlled by the players, would overcome this technical limitation. Still, the players in this case would not be able to verify by themselves that the generation of randomness had been fair.

Additionally, there are some other proposals that happen to be, at the most, partial solutions to possible security problems encountered during the development of the games. None of them however develops any solution to the issue of the fairness of the generated randomness. As examples, the inventions described in U.S. Pat. No. 4,926,327, U.S. Pat. No. 5,038,022, GB 2307184, present methods and/or systems related to the operation of electronic games. Other inventions are focused on network-level security, proposing the use of cryptosystems to ensure the security of the communications between the different participants in the games, but however without paying any attention to the previously described issues of the fairness and the honesty of the games. Representative examples of these inventions can be found in the references U.S. Pat. No. 6,106,396, U.S. Pat. No. 6,117,011, U.S. Pat. No. 6,264,560 and WO 98/11686.

Finally, the third trust problem that is still not adequately solved refers to the possibility of inspecting and auditing electronic gaming systems. Obviously there is a need for reliable, external and independent control of the honesty essential characteristics of an electronic gaming module. These essential characteristics include the control of players' identities, the honesty of the development of the games, and the fitting of the games with the limitations posed by the regulation or by the account of every player (e.g., with regard to the maximum amount to be wagered monthly). Currently, however, the external control of these characteristics relies on audits that depend excessively upon data provided by the games operator itself. In addition, these data are not adequately protected and, as a result, they could be very easily manipulated. Up to date, there are no proposals, efficient enough, that introduce methods to audit in a secure way the occurred games. In on-site electronic gaming environments, some inventions comprise contributions to reach a certain degree of security. As an example, US200424321 proposes means for fraud detection by developing the games in two separate machines and monitoring the latter to detect eventual fraud. The proposal of invention US2004198494 consists of using a cryptographic apparatus to ensure the security of the gaming module. This is done by preventing the access by non-authorized persons and/or possible manipulations. However, the auditing method proposed by both inventions is not efficient and is not completely secure in real electronic gaming environments. Indeed, these are solutions that need to manage huge amounts of digital data, since they utilize absolutely all the information related to the occurred games. Additionally, these proposals do not provide any mechanisms to ensure that the digital information to be audited has not been manipulated during the games or afterwards.

To conclude, all previous proposals known by the inventors fail to specify a game operation that covers an entire cycle allowing players, even without their direct implication in the generation of randomness, to verify the honesty and fairness of the games. In addition, the auditing process is generally not addressed in previous inventions. Those proposals that address this issue, propose costly (given the huge amounts of data to be processed in real time during the games) and not reliable (because of their dependency on data that is not adequately protected) auditing mechanisms. Moreover, these auditing mechanisms do not provide any conclusion regarding the identity of the players that have participated in the games.

SUMMARY OF THE INVENTION

The present invention can be applied both to on-site and remote electronic gaming systems. The present invention proposes a method and a system that provide electronic gaming systems with the capability to generate trust. By trust, we understand the security or warranty that the development of the games remains fair and honest, among other characteristics. This objective is achieved through the creation of a file of protected records that allows the players or a third party (such as a regulator or an auditor) to verify that the different events occurred during the games correspond to an honest development (according to the rules of each game), a fair generation of the randomness (in those games that require it), and a list of imposed restrictions of different types (e.g., regarding the age of players or the maximum amounts to be wagered).

The present invention introduces the use of two additional modules that work jointly with the gaming module. The first additional module, called the security module, is responsible for the secure generation of protected records that allow reproducing, later on, what has happened during the development of the games. Furthermore, this security module is responsible for the honest and fair generation of random events (in those cases when they are needed). The second additional module introduced by the present invention, called the audit module, takes the protected records generated by the security module as input to reliably reproduce the occurred games. The audit module generates audit reports regarding the different issues that concern the electronic gaming module's trust and honesty. Providing the players with part of these reports allows them to verify the correct development of the games, even though the method proposed in this invention is transparent to the players during the execution of the games.

In this way, the present invention firstly describes a method to generate audible and secure records that contain information that allows to reconstruct what has happened during the games, with the objective to verify whether fraud has occurred or not. The invention secondly describes the characteristics of the cited security and audit modules associated to a gambling module, which allows the implementation of said method.

Along the present invention, the term "significant event" will mean an action or event that reflects an important happening related to the game which determines the development of a game's hand in its main aspects.

An objective of the present invention is to generate records of said significant events that typify the development of games, providing said records with adequate protection to prevent manipulations. With this goal in mind, the security module interacts with the gaming module and generates records based on data provided by the gaming module. The security module uses cryptographic protocols that protect the records after their generation. All these activities lead to the creation of a file of protected records. The security module individually protects every single record using cryptographic measures. It also protects the entire sequence of records to prevent alterations in the ordering of the records or eliminations of parts of the sequence. Furthermore, the cryptographic protections developed by the present invention are especially efficient even though they are partly based on the digital signature mechanism (which is considered to be a computationally costly operation).

It is another objective of the present invention to ease the task of auditing the electronic games by third parties. To achieve this objective, the invention introduces the audit module which allows reliable and efficient audits. These audits are done by taking said file of protected records as a basis. The cryptographic protection provided by the security module during the generation of the records, allows the audit module to verify that the records have been generated by a correct security module and have not been altered afterwards. It also allows verifying that the sequence of records is complete and the ordering of the records is the original one.

The division of the proposed system into two modules, namely security and audit, is a novel feature that enables controlling the games without too much intrusion in the natural dynamics of the development of the games in the electronic gaming module. All the intelligence related to the games (e.g., the logic of the different types of games or the management of the different variants of the games) is placed on the audit module. This allows the security module to be just a simple secure registry module. This characteristic implies a number of significant advantages in terms of performance and flexibility. On one hand, the general performance of the entire system is improved, as the security module is performing critical tasks in real time that could affect the development of the games. On the other hand, the evolution of the games (e.g., the introduction of new varieties or the modification of established rules) affects only the audit module, which is less sensible for the development of the games in real time. Indeed, the security module is integrated or interconnected with the gaming module, and both are in constant communication with each other. On the contrary, the audit module can act completely disconnected from the gaming module. In this way, although an insufficient performance of the security module could affect in a negative way the global performance of the gaming module perceived by the players, the same would not occur if the audit module underperformed. In the latter case, the development of the games and the interaction between the players and the gaming module would not be affected at all.

Another objective of the present invention is to allow the security module to actively participate in the determination of random events that are electronically generated (in the case of games of chance). This is achieved either by means of the whole generation of random events by the security module or by a joint generation with the gaming module. In this respect, the present invention has the objective of ensuring a fair development of games and also the capability to audit such fairness. This is a superior objective in relation to those of previous inventions, which are limited to ensuring the fairness of the generation of the base random numbers.

An important improvement introduced by the present invention in relation to previous inventions is the warranty offered to players regarding the fairness and honesty of the games, without the need to involve them directly in the control process or in the randomness generation process. This feature substantially improves the efficiency of the resulting protocol. It is an objective of the present invention to allow the delegation by the players to a third party with regard to the control of the honesty of the games. The present invention also provides the players with mechanisms to verify that such delegation has lead to an effective and sound control.

The present invention provides an adequate combination of cryptographic protocols with physical protection measures (through sealed hardware systems). This combination allows maintaining a file of protected records in a regular database that is stored in the premises of the games operator itself, but however leaving no possibilities of manipulation of the records by privileged staff.

Lastly, but not least, the present invention has an additional objective of supporting the control of the identification of players, with capability of audit by third parties. In this way, the invention composes in a single system the control of the fairness and honesty of the games with the control of the players' identities.

The method proposed by the present invention is characterized by the following basic steps, performed for a subset or all of the occurred significant gaming events: provision by the gaming module to the security module of digital information containing a significant gaming event; generation in said security module of a protected record for each significant event received in the digital information provided by the gaming module; storage of said protected record, giving place to a file of protected records. The method comprises also an additional step of verification of the correct development of the games, which is done in the audit module from the information contained in the file of protected records. This verification step can be done during the games or later on, for example depending on several audit criteria considered.

Should any fraudulent operation occur during the games in the gaming module, the method ensures its detection by means of reliable audits. The method considers also the possibility of sending information to players, through different channels, to allow them to verify the correct development of the games by themselves, possibly instantly in real time.

For those cases that require the electronic generation of randomness, the method considers three possibilities: individual generation by the gaming module, individual generation by the security module, or joint generation between the gaming module and the security module. In all the cases, the generation process is adequately recorded to enable a subsequent audit.

The security module is directed to the generation and protection of records referred to the main events that occur during the games. The security module preferably includes a cryptographic hardware that can perform this task securely against possible attacks and/or manipulations. The security module stores the generated records in a file (namely the file of protected records). This file can be optionally stored on a write-once device that prevents its further manipulation.

The audit module used in the system that implements the proposed method comprises, in its most basic form, the following elements: data input/output means that allow accessing the file of protected records stored by the security module, and processing means that allow to process information relative to the protected records contained in said file of protected records.

Other characteristics of the present invention, and in particular the concrete characteristics of the steps of the method and the elements that constitute the security and audit modules, will be described in deeper detail next, and explained with supplementary drawing charts.

Figure 3:
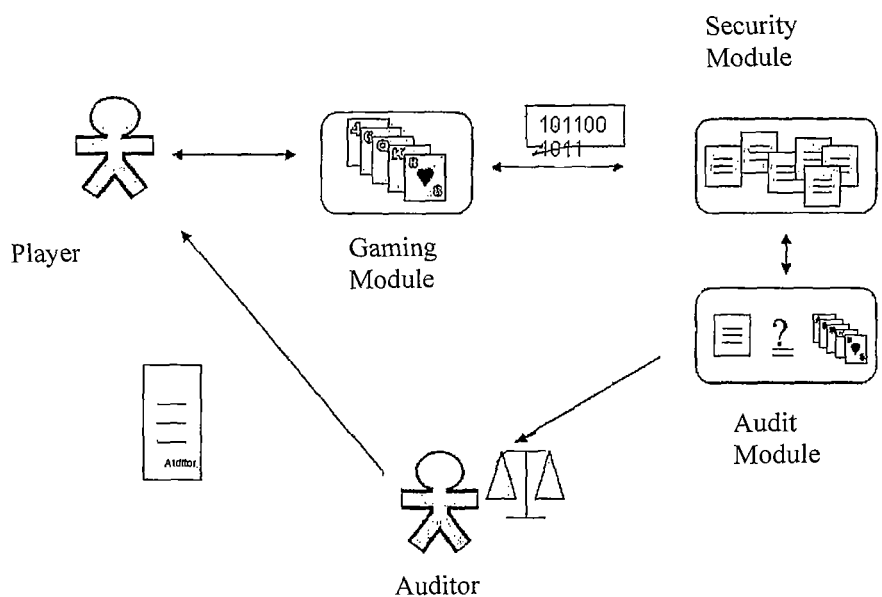

As it is shown in FIG. 3, some authorized parties (such as auditors) have access to the audit information that is generated by the audit module. These authorized parties can conveniently send some kind of report to the players, providing information related to what has happened during the games. This type of reports will allow the player to verify the correctness of what occurred during the games (for example in relation to the fair generation of randomness).

Figure 4:
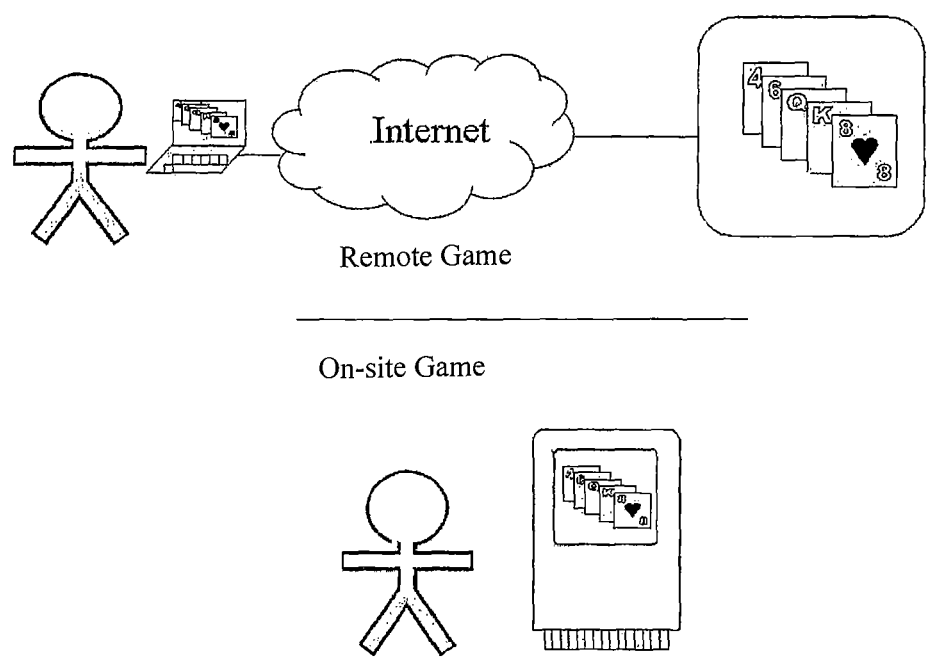

The present invention refers both to on-site and remote games by electronic means, as it can be seen in FIG. 4.

Figure 5:
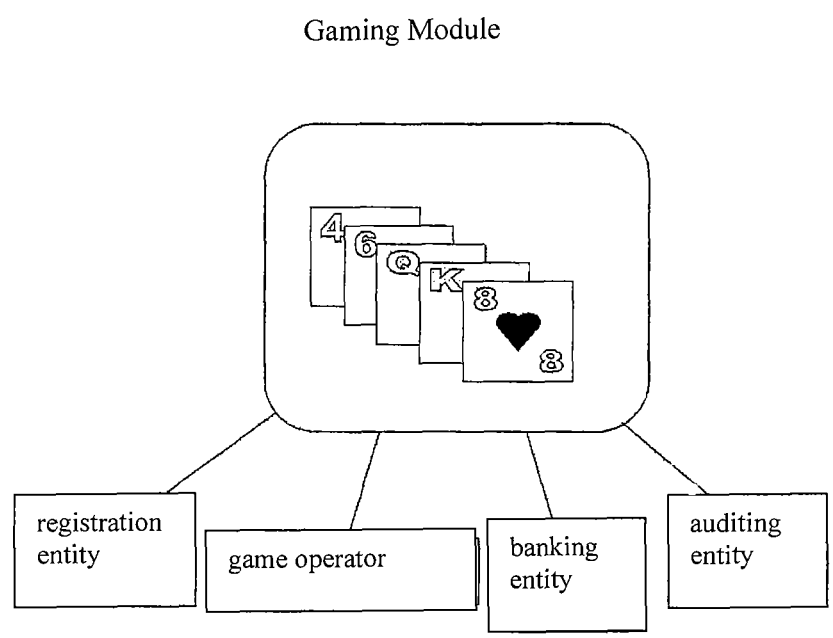

FIG. 5 shows some of the basic elements that may have a relationship with, or may integrate, the gaming module. A registration entity mainly responsible for controlling the identity of the players that access the games, a games operator that represents the owner or manager of the gaming module, a banking entity that provides a payment gateway for the economic transactions related to the games and, finally, an auditing entity responsible for verifying that the games develop or have developed correctly.

Figure 6:
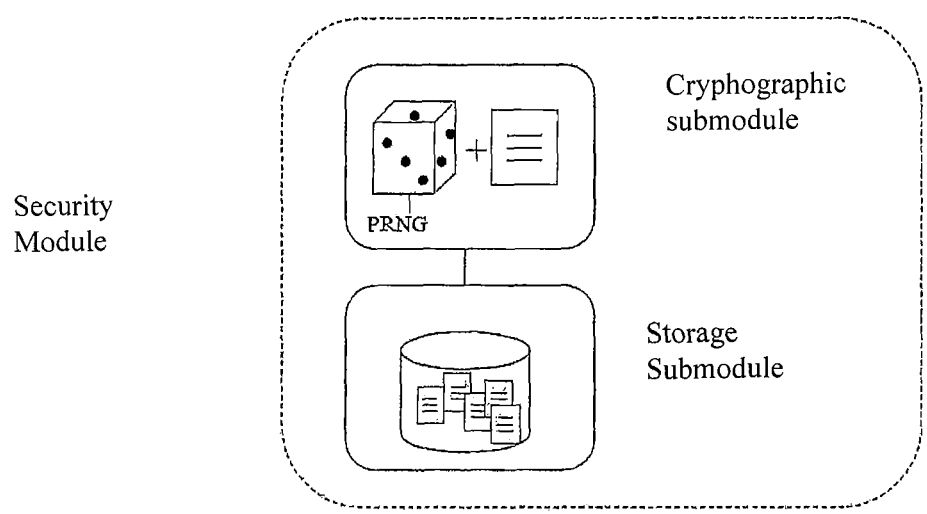

FIG. 6 shows the two sub modules that may conform the security module. On one hand, the cryptographic sub module, which in a preferred implementation contains a random numbers generator (RNG), and which provides protection to the records generated after the significant events occurred during the games. On the other hand, the storage sub module, which stores the file of protected records.

Figure 7:
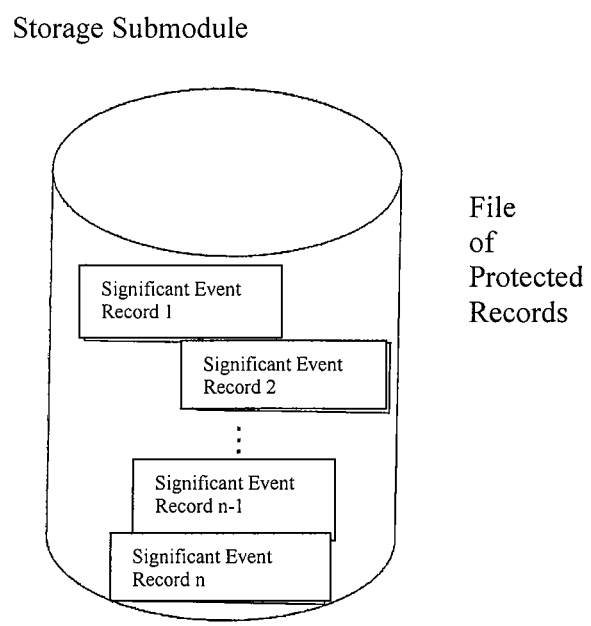

As FIG. 7 shows, said file of protected records is constituted by the succession or sequence of the different protected records previously generated by the security module.

DETAILED DESCRIPTION OF THE INVENTION

The present invention proposes the use, together with an—either on-site or remote-electronic gaming module, of an independent unit that allows ensuring the honesty and trustworthiness of the developed gaming operations. The independent unit introduced by the present invention is connected to or integrated with the gaming module, and it has the following main goals:

to participate in the generation of randomness, when the logics of the games require it;
to maintain a file of protected records; and finally,
to enable reliable audits of the development of the games.

Figure 1:
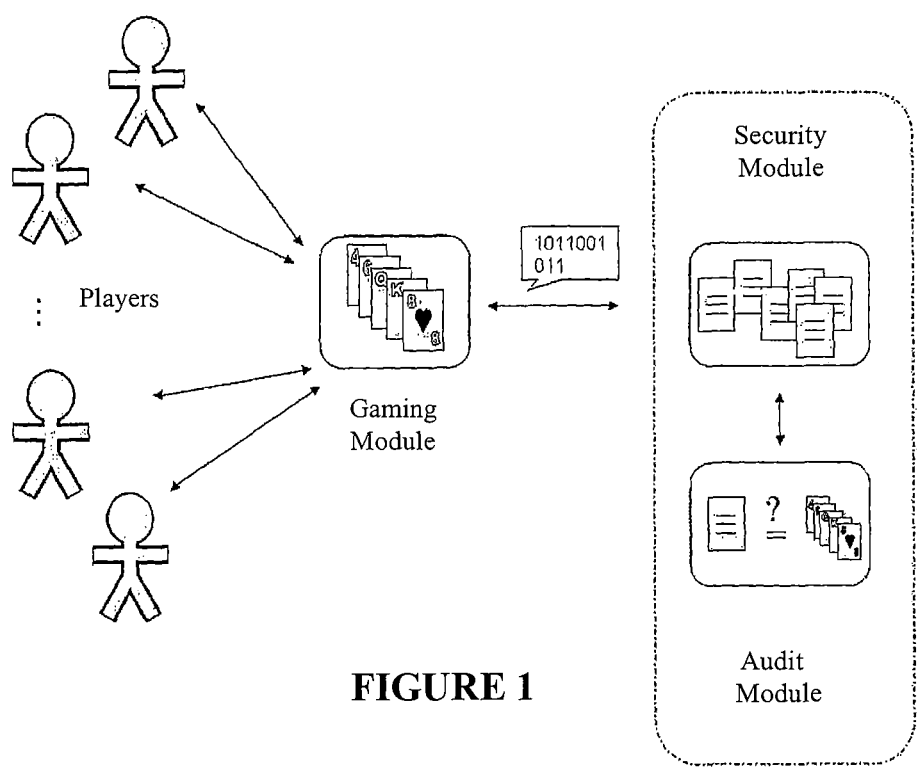
FIG. 1 shows, in a simplified way, the main elements which the method and system of the present invention are implemented on. A player, or a plurality of players, interacts with a gaming module. This gaming module is connected to a security module that, together with the audit module, will be responsible for ensuring the honesty and fairness of the games developed by electronic means.

More concretely, to achieve these goals the present invention introduces two clearly differentiated modules (capable of several degrees of grouping and/or dispersion): a security module and an audit module (see FIGS. 1 and 3). Both modules constitute the cited independent unit.

The security module is destined to the generation and protection of records referred to the main events that occur during the games. The security module preferably includes a cryptographic hardware that can perform this task securely against possible attacks and/or manipulations. The security module stores the generated records in a file (namely the file of protected records). This file can be optionally stored on a write-once device that prevents its further manipulation.

The audit module is directed to the verification of the correct development of the games, taking as the basis the information contained in the file of protected records (to achieve this, the audit module has access to the file of protected records). The present invention considers both the possibility that this verification is done in real time throughout the development of the games and the possibility that this verification is done later on, at predetermined times according to some audit reasons. In any case, the present invention always allows the player to verify the honesty and fairness of the games. For this, part of the information generated by the audit module is sent to each of the players, for example by means of a mobile telephony's short message or an email.

Therefore the present invention distributes the computational load of the proposed method to enable reliable audits, among the two cited modules. The major computational load (requiring the analysis, sometimes exhaustive, of the protected records) falls on the audit module. In this way there is no interference to the game dynamics established by the players with the gaming module. The security module, in constant interaction with the gaming module, is limited to tasks of copying and/or encrypting digital information. All the intelligence referred to the different game logics is shifted to the audit module. This eases the management and the updating of the game logics and the addition of new games, again without interfering the behavior of the security module and, in consequence, without altering in any way the game dynamics between the gaming module and the players.

Next we will describe in deeper detail the system introduced by the present invention, along with the different parts that have a relationship with, or that are integrated with, an electronic gaming module.

Firstly, it is assumed that a player or a plurality of players (see FIG. 1) participate in the games by electronic means. The games, of certain varieties, are offered to the player or players by means of a gaming module, either on-site or remotely (see FIG. 4). On-site games allow a direct interaction, in presence, with the players, through systems such as video lottery terminals (VLT) installed in playing rooms or bingo houses. On the contrary, remote electronic games allow a distant interaction with the player, through a communication network such as the Internet. In both cases, the gaming module, which knows the logics of the games, interacts with the players. The gaming module receives information from the players in relation to the decisions they take during the development of the games. Also, the gaming module presents to the players the evolution of the games. Frequently, the gaming module records the operations undertaken during the games. When needed (specially in the case of remote games), the players usually have an execution platform (for example, a gaming kiosk, a personal computer, a personal digital assistant, or a mobile phone) and/or a set of programs or computer applications that allow them to interact with the gaming module. From now on, if the contrary is not specified, the term "player" will refer both to the person that plays and to his/her related programs.

The main elements or parts that have a relationship with, or that integrate, the gaming module to which the players interact with are (see FIG. 5):

- A registration entity mainly responsible for providing credentials to the players in order to allow their authentication by the gaming module, either on-site or remotely. In the case of remote games by electronic means, such credentials could be, for example, a "loginame" and a "password", or a pair of properly certified asymmetric keys;
- A games operator, owner or manager of the gaming module and responsible for its operation;
- An auditing entity responsible for verifying that the gaming operations developed by the gaming module fulfill predetermined honesty and fairness criteria. These criteria are determined for example by the relevant regulation on the field of electronic gaming;
- A banking entity responsible for managing the flux of money caused by bets and payment of prizes during the development of the games.

The security module introduced by the present invention has also an important relationship with the gaming module.

The security module is adapted to be integrated or connected with a gaming module. The security module consists of a set of programs and/or execution platforms to implement those operations required by the method described in the present invention. This security module generates, by means of processing means, protected records after the information provided by the gaming module which is obtained through data input/output means. The module stores said protected records in a file, by means of storage means.

In a preferred implementation (see FIG. 6), the security module consists of two differentiate sub modules: a cryptographic sub module and a storage sub module. The cryptographic sub module includes sealed hardware that provides physical protection measures to part of the processing means of the security module. The sealed hardware can even store some information if required (therefore providing physical protection also to part of the storage means of the security module). To cite an actual example, the sealed hardware included in the cryptographic sub module could be such as a Hardware Security Module (HSM). This type of component can be found in the marketplace. The product nShield by nCipher [http://www.ncipher.com/nshield/] is an example. It is secure, tamper-proof hardware capable of executing some applications and computer programs, capable of executing some cryptographic primitives, and capable also of storing and managing cryptographic keys. It could also be, alternatively, a cryptographic board or an ejectable device such as a smartcard.

Regarding the storage sub module (see FIG. 7), in a preferred implementation of the invention it would be a database server. The invention considers also the case in which the storage sub module uses a "write once, read many" (WORM) device. The storage sub module could be directly interconnected or integrated with the cryptographic sub module. On the contrary, it could also be physically separated from said cryptographic sub module. In the latter case, both sub modules would have data input/output means to allow their interconnection through a communication network such as the Internet.

The processing means of the security module include, in a preferred implementation, a random numbers generator. It could be a hardware device that generates random numbers. It could also be a software algorithm that generates pseudorandom numbers. It could also be a combination of both. In this latter case, a true random seed would be used to generate a sequence of pseudorandom numbers. Some examples of pseudorandom numbers generators are listed in [FIPS PUB 140-2: Security Requirements for Cryptographic Modules, http://csrc.nist.gov/cryptval/140-2.htm, April 2005] or [Appendix 3 of FIPS PUB 186: Digital Signature Standard, http://csrc.nist.gov/publications/fips/fips186-2/fips186-2-change1.pdf, May 2005] and [RFC 1750: Randomness Recommendations for Security, http://www.ietf.org/rfc/rfc1750.txt, May 2005].

The security module is also adapted to store at least a key to perform cryptographic operations on the digital information obtained from the gaming module. The security module is also adapted to record at least part of the results of said cryptographic operations. The gaming module would also be, in a preferred implementation, adapted for the storage of cryptographic keys.

Regarding the logical interconnection between the gaming module and the security module, the present invention considers the possibility that both modules are logically interconnected, preferably by means of an Application Programming Interface (API). The API enables the dialog between the gaming module's software and the security module's software. In essence, the API provides the—either on-site or remote—gaming module with a well-defined interface. Through this interface the gaming module can access, easily and in a standardized way, the functionalities offered by the modules claimed by the present invention. This access can take place without having to know the internal details of the modules. Furthermore, the API provides high independence regarding future evolutions of the modules. In addition, the API performs also the tasks of dynamic load balancing when, for performance reasons a single gaming module gets connected to more than one security module. In this respect, the software that constitutes the API is responsible for distributing the requests of the gaming module across the several security modules, according to their respective availability.

The audit module is adapted to be connected or integrated with the security module. The audit module has access, through data input/output means, to the file of protected records stored by the security module. When the security module is divided into the two previously cited differentiated sub modules, the present invention considers the possibility that the audit module has access to the storage sub module in order to obtain information from the file of protected records. Like the security module, the audit module consists of a set of programs and/or execution platforms for those operations claimed by the method of the present invention. The audit module can verify the correct development of the games thanks to the processing means it has.

Even though the set of modules that are proposed in the present invention can be individually or collectively grouped, in a preferred implementation the security module and the audit module are physically apart. In any case, the audit module has access to the file of protected records, for example by means of a physical support such as a CD-ROM or by means of a remote access through a communication network.

In a preferred implementation, the audit module would be completely disconnected from the gaming module. However, it could have simultaneous connections with one or more security modules. Likewise, a single security module could have simultaneous connections with one or more gaming modules.

The present invention also claims a method that allows, when implemented through the previously described system, ensuring a list of trust requirements (such as honesty and fairness) regarding the actions occurred during a game by electronic means, either on-site or remote. The foundation of the method is the secure preservation of information related to the significant events of any game, to enable at any moment its analysis and auditing with complete reliability. As it has been previously indicated, a significant gaming event is any action or event that reflects an important happening related to the game and which determines, in its main aspects, the development of a game's hand. Examples of significant gaming events would be some decisions by players such as to join or to leave a game table, or to place a certain bet. It would also be an example of significant gaming event, in the case of the roulette, the final slot where the ball stops on. In an electronic gaming system, the significant gaming events can be internally represented by means of digital information, which can be transferred during the games across the different elements that constitute the gaming system.

In this way, for example, the authentication of a player that accesses said gaming module corresponds to a significant event of a game by electronic means. This authentication can be done in different ways, depending on the desired security level. For example, access to the games can be granted to a player after validating his/her "loginame" and "password", which are previously associated to him/her. A Public Key Infrastructure (PKI) can also be used to provide players with digital certificates, enabling a stronger authentication process. Currently, biometric patterns are also used to authenticate the players that access some games. The recent advances in the cryptographic techniques known as ID-Based or Identity-Based, also make these techniques suitable as a possible authentication method. Be that as it may, when the significant gaming event corresponds to the authentication of a player that accesses the gaming module, this module can provide the security module with digital information that allows the reproduction of the authentication process. The gaming module could also provide additional information, related to the geographic location of the player that accesses the games. In the case of remote electronic gaming, such location would be determined by the situation of the terminal used by the player to remotely access the gaming module through a communication network. This could represent another significant gaming event. In fact, however, the location of a player and his/her authentication at the moment of accessing the game could be joined constituting one single significant gaming event that would comprise both aspects.

Another significant gaming event would be the beginning of a hand of a certain game, or the incorporation of a player to such hand. The description of said significant event would be constituted by the essential characteristics of the hand (such as the game type, the variety of game, and the wager limits, for example).

Another significant event of importance corresponds to a decision or a game action by a player, such as for example the decision of wagering a certain amount or the action of operating the rolling-pins of a slot machine, or yet the decision of taking an additional card.

When required by the logics of the game, it could be necessary to generate randomness during the game. The generation of randomness serves to determine for example where will the ball of a roulette stop, or what is the precise final situation of every card after a deck has been shuffled. The generation of randomness is also a significant event of crucial importance. The electronic generation of randomness needs in first place to obtain or to generate a pseudorandom number or a true random number. Secondly, the obtained number is scaled to the adequate range, according to the expected type of random event (for example, throwing a dice requires a number from 1 to 6, while stopping the ball in the roulette requires a number from 0 to 36). Thirdly, the scaled number is converted to the final random outcome, by applying a predetermined mapping function.

The present invention considers three different methods to generate random events. Firstly, the individual generation by the gaming module with no intervention from the security module. Secondly, the individual generation by the security module with no intervention from the gaming module, for example by using a random numbers generator located inside the cryptographic sub module. The present invention considers also as a third alternative the option of generating randomness jointly by the gaming and security modules.

In any case, the gaming module is always responsible for leading the development of the games and the interaction with the players. For this reason, in the second and third previous options (generation of randomness by the security module and joint generation of randomness), the gaming module should initiate the process of randomness generation, by means of a request to the security module. The gaming module should always be finally notified of the definite outcome of the generation of random event, in order to be able to proceed with the development of the game. If desired, such notification could be digitally marked to ensure its authenticity and integrity (for example by means of an asymmetric or symmetric digital signature). The protocol would finish, in a preferred implementation, with a final confirmation by the gaming module to the security module.

In the case of a joint generation of randomness, a preferred implementation fundamentally uses two cryptographic tools. On one hand, a secret sharing scheme, which allows to generate random numbers in a distributed way while preventing any of the involved parties (in this case the gaming module and the security module) from having any information related to the upcoming outcome and from being able to foresee it in any way. On the other hand, a commitment protocol, which prevents any fraudulent manipulation by any of the parties involved in the joint generation. In addition, with the objective of providing additional security to this process of generation, the present invention considers also the use of additional cryptographic tools, such as simple or distributed digital signatures, that would ensure integrity, authenticity and non-repudiation. The protected record associated to this significant event of joint generation of randomness will store, in a preferred implementation, the digital information needed to reproduce, later on, in a truthful way, the process of joint generation of randomness. This will allow verifying that the previously mentioned security characteristics are fulfilled.

There are other types of significant gaming events, which are worth considering during the normal operation of a gaming module and its interactions with the players. For example, the setting or the updating of some parameters relative to the account of a player (such as the maximum amounts to be wagered per hand or some details relative to the payment methods that will be used to pay or to draw bets and prizes). The payment of prizes itself can be considered as a significant gaming event. Also, some communications or notifications by the gaming module to a player can be a significant event (for example, notifications related to the total time elapsed since the player first accessed the games). Finally, a last example of significant event would be the act of quitting a hand or a game by a player.

The method of the present invention is characterized in that during the game, for every significant gaming event (or at least for every one of the significant events of a set considered to be convenient), the security module generates a record that will allow to accurately reproduce the associated significant event. Moreover, said record is protected to prevent any further manipulation once it has been generated. The set of protected records is stored in what is called a file of protected records. This file of protected records will allow the audit module to verify the correct functioning of the games, as it will be specified later.

Figure 2:
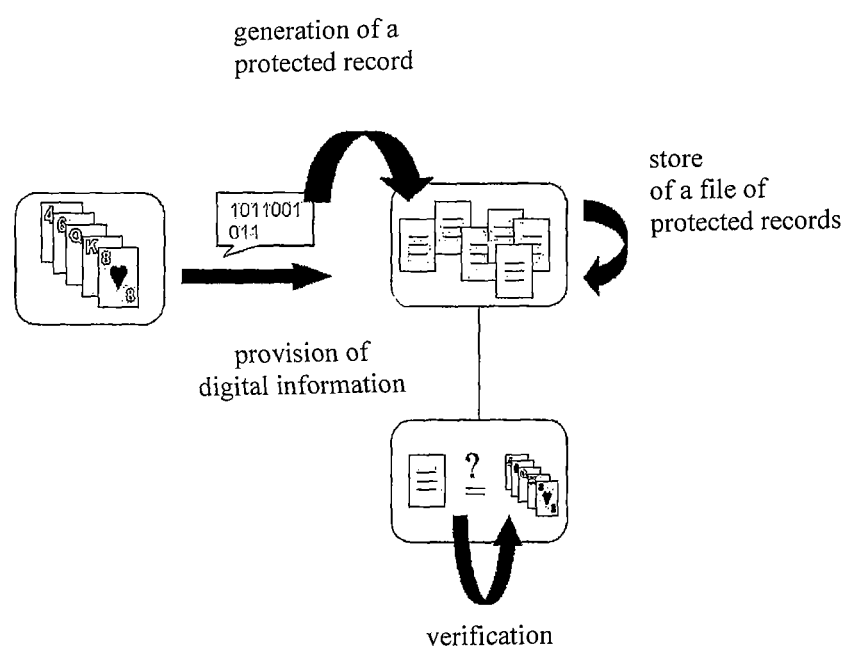
FIG. 2 explains in a summarized way the main steps that characterize the method proposed in the present invention. The gaming module provides the security module with digital information related to a significant gaming event. Next, the security module generates a protected record associated to said significant event and stores each of these protected records. This gives place to a file of protected records. Finally, the audit module accesses the file of protected records at some time, to verify the correct development of the occurred games on the basis of the significant events.

In more detail, according to the proposed method, for each of at least a subset of said significant gaming events, the following steps are performed (see FIG. 2):
  a) a gaming module destined to interact with at least a player provides a security module with digital information that contains at least part of a significant event;
  b) the security module generates a protected record of at least part of the significant event, from the digital information received in the previous step a); and
  c) storage of the protected record, giving place to a digital file of protected records.

At some moments, an audit module destined to the generation of auditing information, verifies, after at least part of said digital file of protected records, the correct development of the occurred game. Said verification is not necessarily done permanently for each of the significant events that happen throughout the games, but it could be done after a certain number of significant events have occurred. In this way, to do said verification, the audit module takes into account a determined number of said significant events, which are selected according to an audit criterion. This criterion can be conditioned by the logic of the game itself, or it can be determined for example by the specific regulation on the field of electronic gaming. For example, all the significant gaming events occurred during the last week could be taken into account for the audit.

Said gaming, security, and audit modules, are capable of several degrees of dispersion and/or grouping. And some cryptographic protocols are used for the protection of said records.

The subset of significant events for which the steps a) to c) are performed will depend on the different implementations. In a preferred implementation, said subset is the totality of the significant events occurred during the development of the games.

In a preferred implementation, the security module stores the digital file of protected records in a database. Additionally, the protected records can be stored in a write-once device, to increase the physical protection awarded to the records. In any case, the present invention considers the possibility that the digital file of protected records is kept aside from the gaming module, to increase its independency from it.

Before providing the digital information described in the previous step a), the gaming module optionally can digitally mark said digital information (for example by means of a symmetric or asymmetric digital signature) to ensure the integrity and authenticity of said digital information.

After the gaming module has provided the security module with digital information related to a significant event, the security module generates a protected record for said significant event. The protection of said record can be diverse. A preferred implementation uses cryptographic protocols. The keys needed by said cryptographic protocols can be stored in the security module itself. In a preferred implementation they would be stored in the cryptographic sub module, to provide them with physical protection (a smartcard or a sealed hardware system offer a very limited access to some areas of their internal memories).

The protection of the records has the objective of addressing mainly the following threats:
  Modification of the ordering in which the significant events occur during the game. An alteration of said ordering could lead to fraudulent manipulations, modifying for example the winner or winners of a game's hand.
  Elimination of significant events. Again, this action could lead to modifications of the logical results of the game.
  Manipulation of significant events.
  Later addition of significant events, which in fact never took place.

The protection provided to the records of significant events must guarantee their immunity before all the previously described threats. At the same time, it must represent an efficient process that does not degrade, in excess, the performance of the security module. In this present invention, different proposals for the protection of said records are suggested.

As first alternative, it is considered the use of a digital signature (symmetric—such as HMAC—, or asymmetric—such as RSA—) associated to each of the protected records that are generated. Nevertheless, this approach is excessively costly from a computational point of view and in addition it does not protect for example before the threat of the rearrangement of the ordering of the records.

The second alternative proposes the addition of some additional redundant information to the record (essentially referring to its ordering), and the digital signing of the final result (again, using a symmetric or asymmetric signature). The redundant information can consist for example of a simple sequence number or a chained hash value (obtained by means of a one-way hash function performed on the present record and on the succession of several previous records). With this procedure, all the previously mentioned threats are disabled. However, the generation of a digital signature for each of the protected records is still inefficient.

Finally, in a preferred implementation of the present invention, a proposal is considered that not only guarantees protection before all of the exposed threats, but that it also represents an efficient alternative to be implemented. The issue is to keep an internal registry into the security module that stores the result of a chained hash value of the protected records as they are being generated. The security module proceeds to digitally sign (using a symmetric or asymmetric signature) the internal registry according to a specified criterion, as it could be after a predetermined number of records or at the expiration of a certain timeout. The internal registry, once signed, is stored along with the file of protected records.

The process of verifying the correct development of the occurred games, done by the audit module, follows in a preferred implementation these steps:
1. Verification of the authenticity and integrity of the protected records that have to be analyzed. The audit module checks whether the records that take as input are authentic (i.e., generated by the security module), have not been altered in any form, and their ordering is still the original one.
2. Reconstruction of the game hands after the significant events contained in the protected records. Every game's hand can be reconstructed in all its critical steps, thanks to the intelligence about the several games incorporated in the audit module and the description about the type and variety of game included in the records.
3. Verification of a set of essential trust features of the games. This task is done by checking the occurred significant gaming events against the rules of the games and/or some predetermined conditions (e.g., some procedures or parameters specified by the relevant regulation on the field of electronic gaming). The audit module can incorporate, from its origin, the rules of the games and eventually the predetermined conditions. Alternatively, these rules and/or conditions can be supplied to the audit module or updated by the competent authority (an auditor or a regulator, for example). The verification done by the audit module in this step includes essential trust characteristics of the games such as:
   a. Validation of the identities of the players, checking that they are not minors nor excluded players.
   b. Validation of the fairness of the games of chance, and validation of the correct and honest behavior of the gaming module according to the rules of every game.
   c. Validation of the in existence of suspicious movements and game decisions. In some cases, a certain game movement can be perfectly valid from the point of view of the game's rules but however it can be highly suspicious (for example, to give up in a poker hand when the player has very good cards).
   d. Validation of the fitting of the games with parameters determined by the account of each player (for example, maximum amounts to be wagered monthly or per hand).
   e. Validation of the payment of prizes, for example by checking the information generated by the payment gateways of the banking entity, in relation to every awarded prize.
4. Generation of auditing reports about the results of the previous step 3). In this way, for example, the cited reports could comprise, among other, information about the status of the player's credit or the results obtained on the different throws or bets. For example, some existing regulations require that this type of reports include the winnings and losing of the player as well as the time elapsed during each hand.

The reports generated by the audit module allow the auditing entity to check the level of accuracy and correctness of the occurred games, according to predetermined criteria. In addition, if large amounts have been won (or lost), additional information can be requested, such as an exhaustive revision of every single movement of money made by any of the players that have participated on the development of the games, or the revision of the identities of the players that have interacted with the gaming module. The present invention considers also the possibility that the audit module has a permanent access to the file of protected records, with the objective of setting instant alarms in real time before fraudulent actions. These alarms could be directed to auditors or regulators, for example.

In the case of sending, perhaps partly, the audit reports to the players, this would allow them to verify by themselves that the security module was effectively involved in the control and secure recording of what happened during their game hands. This sending of information to the players can be done in real time through the gaming system which the players interact with, to provide them with an instant verification of the correct development of the games. Alternatively, the audit information can be sent to the players later on, by means of several external communication channels such as email, mobile telephony's short messages (SMS), or the publication of the audit information on a determined webpage accessible by the players.

The invention claimed is:
1. Method for enabling reliable audits of a number of predetermined confident requirements for games played by electronic means that include a sequence of significant game play events, utilizing the next modules comprised by said electronic means:
   a gaming module for interacting with at least one player,
   a security module for generating in real time a digital file of protected records that takes into account at least a subset of said significant game play events, said security module being in constant communication with said gaming module, and
   an audit module for generating audit information related to past game plays, said audit module including processing means to process information relative to the protected records contained in said digital file of protected records,
said method comprising, for each of said significant game play events which are taken into account for the generation of said digital file of protected records, the following steps:
   a) providing, from said gaming module to said security module, digital information that relates to at least part of said significant game play event;
   b) generating from said digital information of said step a), in said security module, a protected record by means of a digital mark that keeps the ordering of said protected record within a sequence of protected records generated during the game plays and keeps the integrity of this ordering preventing the deletion and/or alteration of records ordering and/or addition of intermediate records; and c) storing in real time the protected record, generating said digital file of protected records, and said method further comprising verifying in said audit module the correct development of the past game plays, from at least a part of said digital file of protected records including a number of said protected records selected according to an audit criterion;

wherein said verification done in said audit module comprises:

the checking of the authenticity and integrity of said protected records of said file or part of said file of protected records;

the reconstruction, based on said file or said part of said file of protected records, of said significant events which occurred during each game play;

the analysis of said reconstructed significant gaming events, in order to verify a set of predetermined requirements essential for the trustworthy and honest development of said game play by electronic means, said analysis being done on the basis of rules of said games and/or of predetermined conditions, that are already loaded on said audit module and/or that are provided to the audit module, wherein said security module and said audit module are separated at least functionally.

2. Method according to claim 1, wherein said digital mark contains at least a sequence number and/or a chained hash value and/or an asymmetric digital signature that additionally ensures the authenticity.

3. Method according to claim 1, wherein said file of protected records generated by the security module takes into account all of the significant game play events and keeps the integrity of the content of said digital information.

4. Method according to claim 1, wherein it furthers include the authentication of a player who accesses said gaming module said authentication being done by means of at least one of the validation of a login name and a password previously associated with said player, the use of a public key infrastructure, or the use of biometric patterns unequivocally associated with said player and the significant game play events that are processed in said steps a), b) and c) including the geographic location of a player who accesses said gaming module.

5. Method according to claim 1, wherein said significant game play events that are processed in said steps a), b) and c) include a selection or a decision related to a game play, made by a player and further including a process for generating a random event related to the game play.

6. Method according to claim 5, wherein said random event is individually or jointly generated by said gaming module, by said security module or by means of a random number generator contained in said security module.

7. Method according to claim 6, wherein said random event is notified to said gaming module, and the digital information sent in said step a) from the gaming module to the security module corresponds to a request for the random event or to an acknowledgement of reception of the random event.

8. Method according to claim 7, wherein said notification to said gaming module is digitally marked in order to ensure that the random event has been generated by said security module and has not been manipulated.

9. Method according to claim 8, wherein said digital marked notification is an asymmetric digital signature.

10. Method according to claim 1, wherein said digital information sent in said step a) from said gaming module to said security module corresponds to digital information that comprises:

a request for the joint generation of the random event, a confirmation of generation of the random event, and or some data necessary for the joint generation of the random event, and wherein:

the result of said joint generation can be digitally marked in order to ensure that said result has been jointly generated by said gaming module and said security module, and has not been manipulated;

the significant game play events that are processed in said steps a), b) and c) can include the setting or the updating of some parameters related to a players account, and the significant game play events that are processed in said steps a), b) and c) can include the payment of a prize.

11. Method according to claim 1, wherein said significant game play events that are processed in said steps a), b) and c) include notifications to a player by said gaming module.

12. Method according to claim 1, wherein said significant game play events that are processed in said steps a), b) and c) include the exit from the game play or from the hand by a player.

13. Method according to claim 1, wherein said digital file of protected records resulting from said step c) is stored in a database and wherein said digital file of protected records resulting from said step e) is stored on a write-once storage device, where that said digital file of protected records resulting from said step c) can be stored independently from said gaming module.

14. Method according to claim 1, wherein each of said protected records generated in said step b) is protected by means of the use of cryptographic protocols and a key where that said key can be stored in said security module with physical protection measures where that said physical protection measures can include at least the use of a hardware security module or a smartcard.

15. Method according to claim 1, wherein said digital mark is stored in said step c) together with said protected record in said file of protected records and can be kept in said security module associated with a certain number of said records, being stored in said step c) in said file of protected records after said certain number of said records.

16. Method according to claim 1, wherein said requirements include at least the validation of the honesty of the game plays, by checking the correct behavior of said gaming module on the basis of the rules of each game and include at least the validation of the fairness of the game plays, by checking the correct generation of the random events and include at least the validation of the non-existence of game play decisions suspicious of fraud and of movements suspicious of fraud and include at least the validation of the fitting of the development of the game plays with parameters that are predetermined and/or determined by the account of every player.

17. Method according to claim 16, wherein said parameters are selected from a set that contains among others the maximum amounts to be wagered per hand or the maximum amounts to be wagered monthly and include at least the validation of the correct payment of prizes.

18. Method according to claim 1, wherein after said verification in said audit module it performs an additional step of generating an audit report wherein at least a part of each audit report is sent to said player and can be done by means of a message to the mobile phone of said player, the publication on a website accessible by said player, or an email to said player.

19. System for games by electronic means that generates a file of protected records enabling to verify the fair development of games by electronic means that include a sequence of significant events, said electronic means comprising:
  a) a gaming module with which at least a player interacts, configured to carry out the development of a game play and including:
    i. means for data input/output to transmit at least digital information containing at least part of some significant game play events;
    ii. processing means,
    iii. means for presenting or sending at least a part of said significant game play events to said player;
    iv. means for data introduction that allow said player to select some actions and/or to take some decisions related to the game play;
  wherein the system comprises the following additional modules:
  b) at least one security module, interconnected to or integrated with said gaming module, that generates in real time, from said digital information, protected records by means of a digital mark that keeps the ordering of said protected records and keeps the integrity of this ordering, after at least a subset of said significant game play events, and stores those protected records in a file of protected records, such security module including:
    i. processing means at least for generating said digital mark,
    ii. means for data input/output to obtain from the gaming module the digital information containing at least part of said significant game play events,
    iii. storage means to store in real time at least said protected records after their generation, and
  c) an audit module operating disconnected from the gaming module, adapted to have access to said file of protected records, comprising:
    i. means for data input/output to access at least part of said file of protected records stored by said security module; and
    ii. processing means to process information relating to said accessed protected records;
  wherein said security module and said audit module are separated at least functionally;
  wherein said security module comprises a cryptographic sub-module and a storage sub-module where that said cryptographic sub-module can include sealed hardware that provides physical security measures to at least part of said processing means of said security module and/or at least part of said storage means of said security module and that said sealed hardware is selected among a hardware security module, a cryptographic board, and/or an ejectable device such as a smartcard and that said storage submodule can be a database server.

20. System according to claim 19, wherein it includes means to allow an on-site interaction, by means of a system such as a video lottery terminal, of said player with said gaming module and it includes means to allow a remote interaction, by means of a communication network such as the Internet, of said player with said gaming module.

21. System according to claim 19, wherein said storage submodule is physically separate from said cryptographic submodule, and both submodules have data input/output means to interconnect with each other through a communication network such as the Internet.

22. System according to claim 18, wherein said processing means of said security module comprise a number generator which is a hardware generator of random numbers and/or an algorithm generator of pseudorandom numbers.

23. System according to claim 19, wherein said storage means of said security module are adapted to store at least a key to be used in cryptographic operations on at least part of said digital information received through said input/output means and that contains at least said significant events and that said storage means of said security module are additionally adapted to record at least part of the results of said cryptographic operations and wherein said gaming module additionally comprises storage means for at least a key to be used in cryptographic operations on at least part of information entered through said means for data introduction and/or at least part of said digital information received through said input/output means and wherein said security module is connected to one single gaming module or to a number of gaming modules greater than one.

* * * * *